United States Patent [19]

Spechko

[11] Patent Number: 5,099,974
[45] Date of Patent: Mar. 31, 1992

[54] ELECTROMAGNETICALLY ACTUATED SPRING CLUTCH

[75] Inventor: John A. Spechko, Vincentown, N.J.

[73] Assignee: Dana Corporation, Toledo, Ohio

[21] Appl. No.: 561,095

[22] Filed: Aug. 1, 1990

[51] Int. Cl.⁵ .............................................. F16D 27/00
[52] U.S. Cl. ........................................ 192/415; 192/35; 192/84 T
[58] Field of Search ...................... 192/35, 41.5, 81 C, 192/84 R, 84 T

[56] References Cited

U.S. PATENT DOCUMENTS

| | | | |
|---|---|---|---|
| 3,149,705 | 9/1964 | Shoquist | 192/35 |
| 3,149,706 | 9/1964 | Mason et al. | 192/35 |
| 3,367,461 | 2/1968 | Nagel | 192/35 |
| 3,685,622 | 8/1972 | Baer et al. | 192/35 |
| 3,735,847 | 5/1973 | Brucken | 192/35 |
| 3,974,902 | 8/1976 | Wahlstedt et al. | 192/81 C X |
| 4,263,995 | 4/1981 | Wahlstedt | 192/35 |
| 4,321,992 | 3/1982 | Gallo | 192/81 C |
| 4,460,076 | 7/1984 | Yamada | 192/35 |
| 4,846,324 | 7/1989 | Ohsawa | 192/81 C X |

FOREIGN PATENT DOCUMENTS

| | | | |
|---|---|---|---|
| 2753012 | 6/1978 | Fed. Rep. of Germany | 192/84 T |
| 65426 | 4/1982 | Japan | 192/84 T |
| 97925 | 6/1982 | Japan | 192/84 T |
| 293328 | 5/1987 | Japan | 192/84 T |
| 57929 | 3/1988 | Japan | 192/84 T |
| 293327 | 11/1988 | Japan | 192/84 T |

Primary Examiner—Allen D. Herrmann
Assistant Examiner—Nicholas Whitelaw
Attorney, Agent, or Firm—Leydig, Voit & Mayer

[57] ABSTRACT

Magnetic flux produced by an electrically energized coil threads radially between a housing and a flange on a rotatable shaft, threads axially between the flange and a control collar for the clutch, threads radially between the control collar and an input hub via a helical spring contracted around the hub, and threads axially between a flange on the hub and the housing to complete the flux circuit. Flux cutting axially between the flange on the shaft and the control collar causes the control collar to shift axially into engagement with the flange so as to effect turning of the collar relative to the input hub and contraction of the spring around an output hub.

8 Claims, 1 Drawing Sheet

ELECTROMAGNETICALLY ACTUATED SPRING CLUTCH

BACKGROUND OF THE INVENTION

This invention relates to an electromagnetically actuated spring clutch and, more particularly, to a clutch of the same general type as disclosed in Wahlstedt U.S. Pat. No. 4,263,995.

In such a clutch, a helical torque-transmitting clutch spring carried by a rotating input hub is caused to wrap down onto an axially adjacent output hub by means of an applied magnetic field. Such clutches are useful in the controlled intermittent operation of numerous mechanical devices such as the paper feeders of office copying machines.

The magnetic field is created by an electromagnet having a coil which, when excited, produces magnetic flux. The flux threads through the components of the clutch and serves to attract a control collar axially into engagement with a pole piece of the magnet. Such engagement causes the control collar to rotate slightly relative to the input hub of the clutch and to cause the spring to wrap down on the output hub so as to couple the two hubs for rotation in unison.

SUMMARY OF THE INVENTION

The aim of the present invention is to provide a new and improved clutch of the foregoing type in which the magnetic flux is directed through the clutch components in a novel path enabling the clutch to operate in an efficient and trouble-free manner and to experience a long service life.

These and other objects and advantages of the invention will become more apparent from the following detailed description when taken in conjunction with the accompanying drawings.

DETAILED DESCRIPTION OF THE PREFERRED EMBODIMENT

Figure 1:
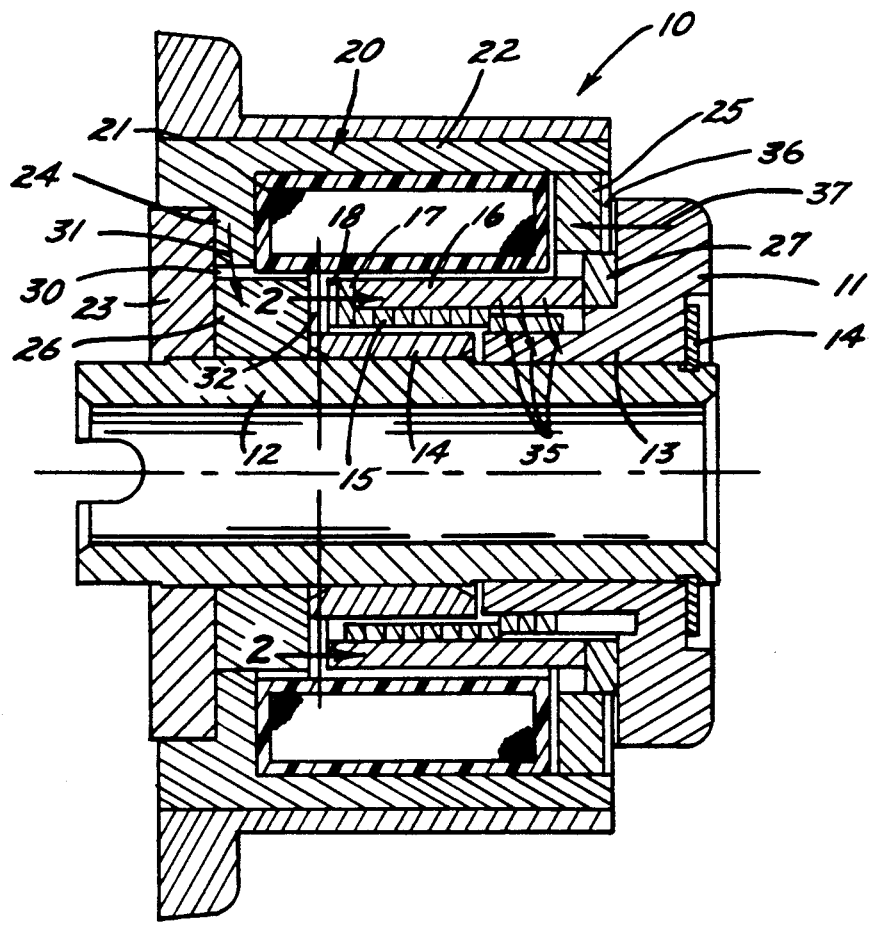
FIG. 1 is a cross-sectional view taken axially through a new and improved electromagnetically actuated spring clutch incorporating the unique features of the present invention.
Figure 2:
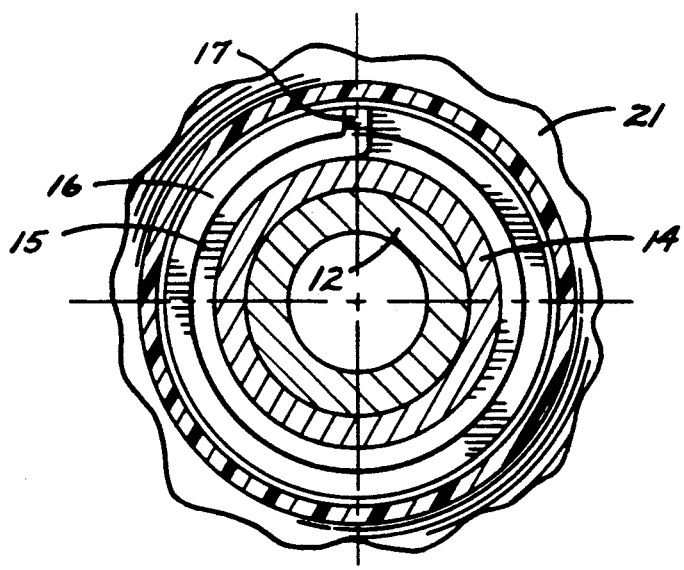
FIG. 2 is a fragmentary cross-section taken substantially along the line 2—2 of FIG. 1.

As shown in the drawings for purposes of illustration, the invention is embodied in an electromagnetically actuated spring clutch 10 for transmitting torque from an input member 11 to an output member 12. Herein, the output member 12 is in the form of a tubular shaft whose axis coincides with the central axis of the clutch 10. The input member 11 may be in the form of an annular flange 13 having peripheral teeth and adapted to be rotated by a toothed belt or the like (not shown).

The flange 11 is fixed to and forms part of a stepped-diameter input hub 13 which, in turn, is supported to rotate on the shaft 12. A snap ring 14 on one end portion of the shaft captivates the input hub axially on the shaft.

Disposed in closely spaced end-to-end relation with the inboard end of the input hub 13 is an output hub 14 which is fixed securely to the shaft 12 to rotate therewith. A helical spring 15 encircles the two hubs and bridges the axial gap between the hubs. The spring is sized such that one of its end portions is contracted tightly around the input hub 13 while its other end portion is normally free of and spaced radially from the output hub 14. A short end tang (not shown) of the spring may be anchored to the input hub in a conventional manner.

Telescoped slidably over the spring 15 is a sleeve-like control collar 16. A radially extending end tang 17 of the spring 15 fits into an axially opening notch 18 in the collar and thus the spring couples the collar for rotation with the input hub 13. When the control collar 16 is rotated slightly relative to the input hub 13, the collar acts through the tang 17 to cause the spring 15 to wrap down on and contract tightly around the output hub 14. When the spring is so contracted, it couples the output hub and the shaft for rotation in unison with the input hub.

Relative rotation of the control collar 16 relative to the input hub 13 is effected in response to energization of an electromagnet 20. Herein, the electromagnet includes an annular coil 21 which is disposed in radially spaced concentric relation with the control collar 16. The coil is supported within a generally cup-shaped housing component 22 which, in turn, is supported by a plastic bearing 23 fixed to the shaft 12. One end portion of the housing is formed with a radially inwardly extending flange 24 which lies along the inboard face of the bearing. The other end portion of the housing is partially closed by a washer component 25 which is inserted into the housing with a press fit after the coil 21 has been assembled with the housing.

The clutch 10 is completed by a flange 26 fixed to rotate with the shaft 12 and located adjacent the bearing 23, the flange 26 being spaced radially inwardly from the flange 24 of the housing 22. In addition, a spacer 27 is pressed tightly onto the input hub 13 adjacent the end of the control collar 16 and fits rotatably and slidably within the washer 25 so as to serve as a bearing between the input hub and the housing 22.

In accordance with the invention, the various components of the clutch 10 are magnetically constructed so as to cause flux produced by the coil 21 to thread radially between the flange 24 of the housing 22 and the flange 26 on the shaft 12, to thread axially between the flange 26 and the adjacent end of the control collar 16, to thread radially between the control collar 16 and the input hub 13 via the spring 15, to thread between the input hub 13 and the flange 11 thereof, and to thread axially between the flange 11 and the washer 25 of the housing 22. As will become apparent subsequently, threading of the flux along such a path attracts the control collar 16 to the flange 26 without imposing axial forces on the bearings 23 and 27. Moreover, axial forces are prevented from being exerted on the bearing 27 by virtue of the slidable fit between that bearing and the washer 25 of the housing 20.

To achieve the desired flux path, the input hub 13, the spring 15, the control collar 16 and the housing 22 are all made of ferromagnetic material having low reluctance to the passage of flux. In addition, the flange 11 of the input hub 13, the flange 26 on the shaft 12 and the washer 25 of the housing 22 are also made of ferromagnetic material. In contrast, the shaft 12, the output hub 14, the bearing 23 and the spacer or bearing 27 are all made of non-ferromagnetic material having a high magnetic reluctance.

With the foregoing arrangement, flux produced by the coil 21 threads a path designated by the arrows in FIG. 1 when the coil is energized by a dc. voltage and is poled to cause the flux to flow in the direction of the arrows. Specifically, flux cuts radially from the flange 24 of the housing 22 and across an air gap 30 to the flange 26 of the shaft 12 as indicated by the arrow 31. The non-ferromagnetic shaft 12, output hub 14 and bearing 23 present flux barriers and thus the flux is forced to travel axially from the flange 26 to the adjacent end of the control collar 16 across an air gap 32 and in the direction of the upper arrow of the section line 2—2. The flux cutting across the air gap 32 attracts the collar 16 axially into frictional engagement with the flange 26 and, since the flange is rotationally stationary at the time of initial engagement, such engagement retards rotation of the control collar and causes the collar to rotate relative to the input hub 13 through a sufficient distance to effect contraction of the spring 15 around the output hub 14. As a result, the input hub 13, the output hub 14, the shaft 12, the flange 26, the spring 15 and the control collar 16 all rotate in unison.

Flux in the control collar 16 passes radially by way of the spring 15 and into the input hub 13 as indicated by the arrows 35. By virtue of the non-ferromagnetic bearing 27 at the right end of the control collar, flux in the control collar is prevented from passing axially to the flange 11 and, as a result, the flux creates a net force acting to pull the control collar to the left into engagement with the flange 26 on the shaft 12.

The flux which passes radially to the input hub 13 threads through that hub and then cuts axially across an air gap 36 between the flange 11 of the hub and the washer 25 of the housing 22 as indicated by the arrow 37 so as to complete the flux circuit. Because the bearing 27 is made of non-ferromagnetic material, the flux is forced to cut axially across the air gap 36 and is prevented from threading radially from the hub 13 to the bearing 27.

Because of the flux path described above and because the bearing 27 is capable of sliding in the washer 25 of the housing 20, no significant axial loads are imposed on the bearings 23 and 27. This enables the clutch 10 to operate in a trouble-free manner over an extended length of time.

I claim:

1. An electromagnetically actuated spring clutch comprising a rotatable shaft, a first hub rotatable with said shaft, a second hub axially adjacent said first hub and supported to rotate on said shaft, a helical clutch spring encircling portions of both hubs, said spring normally being free of said first hub and normally being contracted around and rotatable with said second hub, a control collar telescoped slidably over said spring and having first and second opposite end portions adjacent said first and second hubs, respectively, said spring having an end tang fixed to said first end portion of said control collar to cause said control collar to rotate with said spring and said second hub, and means for rotating said control collar relative to said second hub so as to cause said spring to contract around said first hub, said means comprising a coil encircling said control collar and operable when excited to produce magnetic flux, a rotationally stationary housing encircling said coil and having first and second end portions, a first flange fixed to and rotatable with said shaft, said flange having a first portion disposed in radially spaced relation with said first end portion of said housing and having a second portion disposed in axially spaced relation with said first end portion of said control collar, a second flange rotatable with said second hub and disposed in axially spaced relation with said second end portion of said housing, said shaft and said first hub being made of non-ferromagnetic material, and said second hub, said spring, said control collar, said housing, and said flanges being made of ferromagnetic material thereby to cause flux produced by said coil to thread radially between said first end portion of said housing and said first flange, axially between said first flange and said control collar, radially between said control collar and said second hub by way of said spring, between said second hub and said second flange, and axially between said second flange and said second end portion of said housing, the flux threading axially between said first flange and said control collar attracting said control collar axially toward said first flange and causing said control collar to rotate relative to said second hub so as to cause said spring to contract around said first hub.

2. An electromagnetically actuated spring clutch as defined in claim 1 further including a bearing made of non-ferromagnetic material and supporting said shaft to rotate relative to said housing, said bearing being axially adjacent said first flange.

3. An electromagnetically actuated spring clutch as defined in claim 2 in which said bearing is fixed to said shaft.

4. An electromagnetically actuated spring clutch as defined in claim 2 further including a non-ferromagnetic spacer between said second flange and said second end portion of said control collar to prevent flux from threading axially between said second flange and said second end portion of said control collar.

5. An electromagnetically actuated spring clutch as defined in claim 4 in which said housing is formed by first and second components, said first component having a tubular end portion, said second component comprising a ferromagnetic washer fixed within the tubular end portion of said housing and defining said second end portion of said housing, said washer encircling said spacer.

6. An electromagnetically actuated spring clutch as defined in claim 5 in which said spacer rotates with said second hub and forms a bearing which rotates within said washer.

7. An electromagnetically actuated spring clutch as defined in claim 6 in which said spacer is supported to slide axially within said washer.

8. An electromagnetically actuated spring clutch comprising a rotatable shaft, a first hub rotatable with said shaft, a second hub axially adjacent said first hub and supported to rotate on said shaft, a helical clutch spring encircling portions of both hubs, said spring normally being free of said first hub and normally being contracted around and rotatable with said second hub, a control collar telescoped slidably over said spring and having first and second opposite end portions adjacent said first and second hubs, respectively, said spring having an end tang fixed to said first end portion of said control collar to cause said control collar to rotate with said spring and said second hub, and means for rotating said control collar relative to said second hub so as to cause said spring to contract around said first hub, said means comprising a coil encircling said control collar and operable when excited to produce magnetic flux, a rotationally stationary housing encircling said coil and having first and second end portions, a first flange fixed to and rotatable with said shaft, said flange having a first portion disposed in radially spaced relation with said first end portion of said housing and having a second portion disposed in axially spaced relation with said first end portion of said control collar, a second flange rotatable with said second hub and disposed in axially spaced relation with said second end portion of said housing, said shaft and said first hub being made of non-ferromagnetic material, and said second hub, said spring, said control collar, said housing, and said flanges being made of ferromagnetic material whereby flux produced by said coil threads radially between said first end portion of said housing and said first flange, axially between said first flange and said control collar, radially between said control collar and said second hub by way of said spring, between said second hub and said second flange, and axially between said second flange and said second end portion of said housing, the flux threading axially between said first flange and said control collar attracting said control collar axially toward said first flange and causing said control collar to rotate relative to said second hub so as to cause said spring to contract around said first hub, a first bearing made of non-ferromagnetic material and supporting said shaft to rotate relative to said housing, said bearing being axially adjacent said first flange, and a second bearing made of non-ferromagnetic material and located between said second flange and said second end of said control collar to define an axial flux barrier therebetween, said second bearing being telescoped slidably and rotatably with said housing and forming a bearing supporting said second hub for rotation relative to said housing.

* * * * *